United States Patent
Kuebler

(10) Patent No.: US 9,546,920 B2
(45) Date of Patent: Jan. 17, 2017

(54) TEMPERATURE RANGE OPTIMIZED SENSOR SYSTEM

(71) Applicant: IEE International Electronics & Engineering S.A., Echternach (LU)

(72) Inventor: Karl-Heinz Kuebler, Davisburg, MI (US)

(73) Assignee: IEE International Electronics & Engineering S.A., Echternach (LU)

( * ) Notice: Subject to any disclaimer, the term of this patent is extended or adjusted under 35 U.S.C. 154(b) by 254 days.

(21) Appl. No.: 14/176,248

(22) Filed: Feb. 10, 2014

(65) Prior Publication Data

US 2015/0226620 A1 Aug. 13, 2015

(51) Int. Cl.

| | |
|---|---|
| *G01L 1/00* | (2006.01) |
| *G08B 21/00* | (2006.01) |
| *G01L 1/22* | (2006.01) |
| *B60R 21/015* | (2006.01) |
| *B60N 2/00* | (2006.01) |
| *G01G 19/414* | (2006.01) |

(52) U.S. Cl.
CPC ............ *G01L 1/2281* (2013.01); *B60N 2/002* (2013.01); *B60R 21/0152* (2014.10); *B60R 21/01516* (2014.10); *B60R 21/01524* (2014.10); *G01G 19/4142* (2013.01)

(58) Field of Classification Search
None
See application file for complete search history.

(56) References Cited

U.S. PATENT DOCUMENTS

| | | | | | |
|---|---|---|---|---|---|
| 4,945,768 | A | * | 8/1990 | Sorrells | G01L 11/04 73/703 |
| 4,974,679 | A | * | 12/1990 | Reuter | G01D 3/022 177/185 |
| 7,782,218 | B2 | * | 8/2010 | Krempl | G01G 19/4142 340/665 |
| 8,443,650 | B2 | * | 5/2013 | Sitabkhan | G01F 22/02 73/1.73 |
| 9,176,019 | B2 | * | 11/2015 | Landmann | G01L 19/0092 |
| 2012/0019308 | A1 | * | 1/2012 | Landmann | G01L 19/0092 327/512 |

* cited by examiner

*Primary Examiner* — Peter Macchiarolo
*Assistant Examiner* — Jermaine Jenkins
(74) *Attorney, Agent, or Firm* — Reising Ethington P.C.

(57) ABSTRACT

A sensor arrangement comprises a first sensor element for converting a physical quantity into a first electrical signal and at least a second sensor element for converting said physical quantity into a second electrical signal. The first sensor element has a first sensitivity while said second sensor element has a second sensitivity different from said first sensitivity. The first sensor element is operatively coupled between terminals of said sensor arrangement and said second sensor element is operatively connected between said terminals of said sensor arrangement via a temperature controlled switching element so that in a first state of said temperature controlled switching element, said second electrical signal combines with said first electrical signal to form a sensor output signal, and in a second state of said temperature controlled switching element, the contribution of said second electrical signal to said sensor output signal is substantially reduced with respect to a respective contribution in said first state of said temperature controlled switching element.

17 Claims, 2 Drawing Sheets

Req=> is compared in a vehicle module to a threshold for e.g. < 200 ohm = occupied; >200 ohm = unoccupied seat.

Req=> is compared in a vehicle module to a threshold for e.g. < 200 ohm = occupied; >200 ohm = unoccupied seat.

TEMPERATURE RANGE OPTIMIZED SENSOR SYSTEM

TECHNICAL FIELD

The present invention generally relates to the technical field of sensor systems having sensitivity depending on the operating temperature. In a specific application, the present invention more specifically relates to the technical field of seat occupancy sensors e.g. for use in a safety system of an automotive vehicle, and even more specifically to a seat occupancy sensor having a sensitivity depending on operation temperature range.

BACKGROUND ART

Seat occupancy sensors are nowadays commonly used in automotive vehicles in order to improve the efficiency of secondary seat restraint systems, such as e.g. the vehicle airbags or the seat belt pretension systems. The seat occupancy sensors usually comprise a plurality of individual switching elements, which are arranged in an array configuration and associated to a seating surface of the vehicle seat. The individual switching elements are typically configured as pressure sensors, e.g. force sensing resistors, in which an electrical resistance is depending on the force acting on the seat.

In a possible application of those seat occupancy sensors, an actual seat occupancy status is determined by means of the seat occupancy sensors and, in case of a car crash situation, the airbags associated with the respective seat are deployed only if the actual seat occupancy status requires such deployment. In a different application, the signal of the seat occupancy sensors are used in a seat belt warning system for generating a warning signal if a specific vehicle seat is occupied and the corresponding seat belt is not fastened.

One issue with those seat sensor systems is related to the temperature dependent behavior of the switching elements and/or the environment in which the switching elements are arranged. In fact due to the behavior of the seat material (trims, foams, and suspension and seat structure) and sensors in different temperatures, the sensing capability of sensors is affected. Often with colder temperature, the sensor and seat (i.e. the whole sensing system) will get more insensitive, whereas, at higher temperatures, the whole system can get more sensitive and as a result, the force/pressure behavior is changing (harder vs. softer).

This means that in order to reliably detect an occupancy of a vehicle seat in a low temperature range, it would be preferable to have rather sensitive sensors/sensor features (cells) to make sure to reliably detect the occupant. At a higher temperature range on the other hand, the high sensitivity of the sensor cells may cause the sensor to be triggered by undesired low weight objects such as a bag placed on the seat. It follows that for the high temperature range, it would be preferable to have less sensitive sensors/sensor features (cells) so as to avoid detection of undesired objects on the seat. In other words for low temperatures up to a temperature Tx, one would prefer a sensitive sensor/sensor cell, while above a temperature Tx to high temperatures one would prefer an insensitive sensor/sensor cell. In the environment of an automotive vehicle, the temperature ranges may e.g. from LT=−40° C. to Tx for the low temperature range and from Tx to HT=85° C. Depending on the material used for the seat/sensor, Tx may be approx. 45-65° C.

It will be noted that depending on the application, the sensitivity of a sensing system may decrease with decreasing temperature or increase with decreasing temperature. This means that depending on the application it may also be interesting to have an insensitive sensor/sensor cell for low temperatures up to a temperature Tx and a more sensitive sensor/sensor cell above a temperature Tx to high temperatures.

Technical Problem

It is an object of the present invention to provide an improved sensor arrangement adapted to be used in a large temperature range. The object is achieved by the invention as claimed in claim 1.

GENERAL DESCRIPTION OF THE INVENTION

A sensor arrangement according to the invention comprises a first sensor element for converting a physical quantity into a first electrical signal and at least a second sensor element for converting said physical quantity into a second electrical signal. The first sensor element has a first sensitivity while the second sensor element has a second sensitivity different from said first sensitivity. The first sensor element is operatively coupled between terminals of said sensor arrangement and said second sensor element is operatively connected between said terminals of said sensor arrangement via a temperature controlled switching element so that in a first state of said temperature controlled switching element, said second electrical signal combines with said first electrical signal to form a sensor output signal, and in a second state of said temperature controlled switching element, the contribution of said second electrical signal to said sensor output signal is substantially reduced with respect to a respective contribution in said first state of said temperature controlled switching element.

It should be noted that in the context of the present invention, the sensitivity of a sensor means the minimum magnitude of input signal required to produce a specified output signal having a specified signal-to-noise ratio, or other specified criteria.

With the sensor arrangement according to the present invention, the contribution of the second sensor element in the sensor arrangement output signal depends on the state of the temperature controlled switching element. Thus by suitably configuring the temperature controlled switching element, the contribution of the second sensor element can be controlled as a function of the temperature. Depending on the temperature behavior of the temperature controlled switching element the contribution may be increased or reduced with higher temperatures. Also the temperature dependency of the contribution of the second sensor element may have a number of discrete levels, e.g. if the temperature controlled switching element has discrete states depending on the temperature, or the temperature dependency may show a continuous variation.

Depending on the application specific requirements, the second sensitivity of said second sensor element may be lower than said first sensitivity of said first sensor element. In the context of occupancy sensors to be arranged in a vehicle seat however, said second sensitivity of said second sensor element is preferably higher than said first sensitivity of said first sensor element.

In a possible embodiment of the sensor assembly, said temperature controlled switching element is in said first state when an environmental temperature, i.e. the temperature of the temperature controlled switching element or the temperature at which the temperature controlled switching element is operated, is below a first threshold temperature and said temperature controlled switching element is in said second state when an environmental temperature is above a second threshold. With this embodiment, the second sensor element contributes maximally to the sensor output signal for temperatures below the first threshold value, while the contribution of the second sensor element to the sensor output signal is reduced for temperatures above the second threshold value, which is preferably equal to or higher than the first threshold value. It will be noted, that the first and second threshold values may be identical or the second threshold value may be higher than the first threshold values. In the latter case, the temperature controlled switching element may have an intermediate switching state if the environmental temperature is between the first and second threshold values.

In possible embodiments of the sensor assembly, the said temperature controlled switching element comprises at least one of a negative temperature coefficient (NTC) element, a positive temperature coefficient (PTC) element or a thermo switch, such as e.g. a bi-metal switch. It will be appreciated, that the temperature switching element may of course also comprise a plurality of negative temperature coefficient (NTC) elements, or a plurality of positive temperature coefficient (PTC) elements or a plurality of thermo switches or even combinations thereof.

Preferably the first electrical signal is a resistance of said first sensor element and the second electrical signal is a resistance of said second sensor element. In this case, the electrical signals may easily combine with resistance values of the temperature controlled switching element, which has e.g. a low electrical resistance in said first state and a high electrical resistance in said second state. It will be appreciated that the temperature controlled switching element may also have a high electrical resistance in said first state and a low electrical resistance in said second state.

The second sensor element may e.g. be connected in series with said temperature controlled switching element between said terminals of said sensor arrangement, in which case the series connection of the second sensor element and said temperature controlled switching element are connected in parallel to the first sensor element between the terminals of the arrangement. Alternatively the second sensor element may be connected in parallel with said temperature controlled switching element between said terminals of said sensor arrangement.

It will be noted that the first sensor element and the at least one second sensor element are preferably pressure sensors and accordingly said physical quantity is a pressure acting on said first sensor element and on said at least one second sensor element. The first and second sensor elements may e.g. be configured as foil type pressure sensor cells which are widely known in the art.

In a specific application, the present invention relates to an occupant sensor for a vehicle seat comprising a first pressure sensor for converting a pressure acting on said first pressure sensor into a first electrical signal and at least a second pressure sensor for converting a pressure acting on said second pressure sensor into a second electrical signal. The first pressure sensor has a first sensitivity while second pressure sensor has a second sensitivity different from said first sensitivity. The first pressure sensor is operatively coupled between terminals of said occupant sensor and the second pressure sensor being operatively connected between said terminals of said sensor arrangement via a temperature controlled switching element so that in a first state of said temperature controlled switching element, said second electrical signal combines with said first electrical signal to form a sensor output signal, and in a second state of said temperature controlled switching element, the contribution of said second electrical signal to said sensor output signal is substantially reduced with respect to a respective contribution in said first state of said temperature controlled switching element.

Preferably the first electrical signal is a resistance of said first pressure sensor and the second electrical signal is a resistance of said second pressure sensor. In this case, the electrical signals may easily combine with resistance values of the temperature controlled switching element, which may comprise element comprises at least one of a negative temperature coefficient (NTC) element, a positive temperature coefficient (PTC) element or a thermo switch, such as e.g. a bi-metal switch. It will be appreciated, that the temperature switching element may of course comprise a plurality of negative temperature coefficient (NTC) elements, or a plurality of positive temperature coefficient (PTC) elements or a plurality of thermo switches or even combinations thereof. The second pressure sensor is preferably connected in series with said temperature controlled switching element between said terminals of said occupant sensor.

The first and second sensor elements may e.g. be configured as bending sensors or as foil type pressure sensors which are widely known in the art, and may e.g. be arranged on or in a seating surface of a vehicle seat, under the trim, in or at the suspension of a seat cushion, in or at the seat frame or seat structure of a vehicle seat or in the seat mounting features of a vehicle.

It will be noted that the sensor arrangement may be used in a number of other applications in a vehicle, such as in a pedestrian protection system in which the sensor elements may be arranged in a font bumper of a vehicle or in the energy absorber crossbeam assembly.

BRIEF DESCRIPTION OF THE DRAWINGS

A preferred embodiment of the invention will now be described, by way of example, with reference to the accompanying drawings, which show.

DESCRIPTION OF PREFERRED EMBODIMENTS

Figure 1:
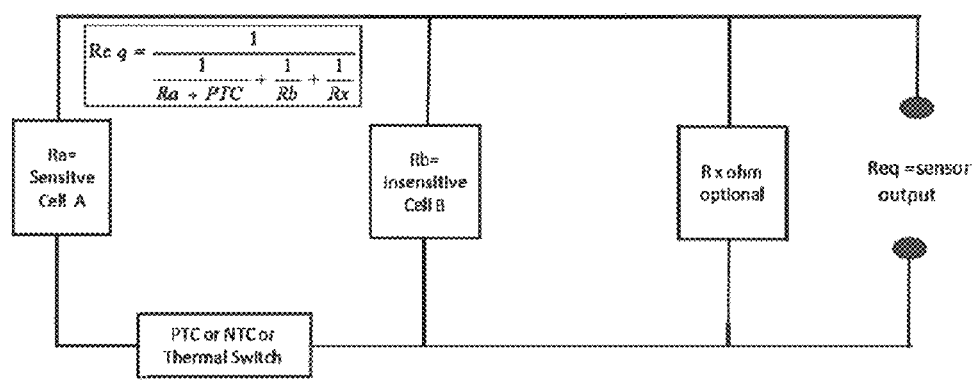
FIG. 1: a simplified circuit diagram of a sensor arrangement in accordance with the teaching of the present invention.

FIG. 1 shows a simplified circuit diagram of a sensor arrangement in accordance with the teaching of the present invention. Cell A is a sensitive cell, while Cell B is less sensitive (in-sensitive). Cell A and Cell B are connected in parallel between the terminals of the sensor arrangement and one of them, Cell A, has an NTC or PTC, or thermo switch (THM) connected in series therewith. The sensor system can then be tuned based on the NTC, PTC or THM behavior over temperature. This will eliminate or reduce the influence/contribution of the affected cell to the overall resistance of the sensor and therefore the sensor output.

Figure 2:
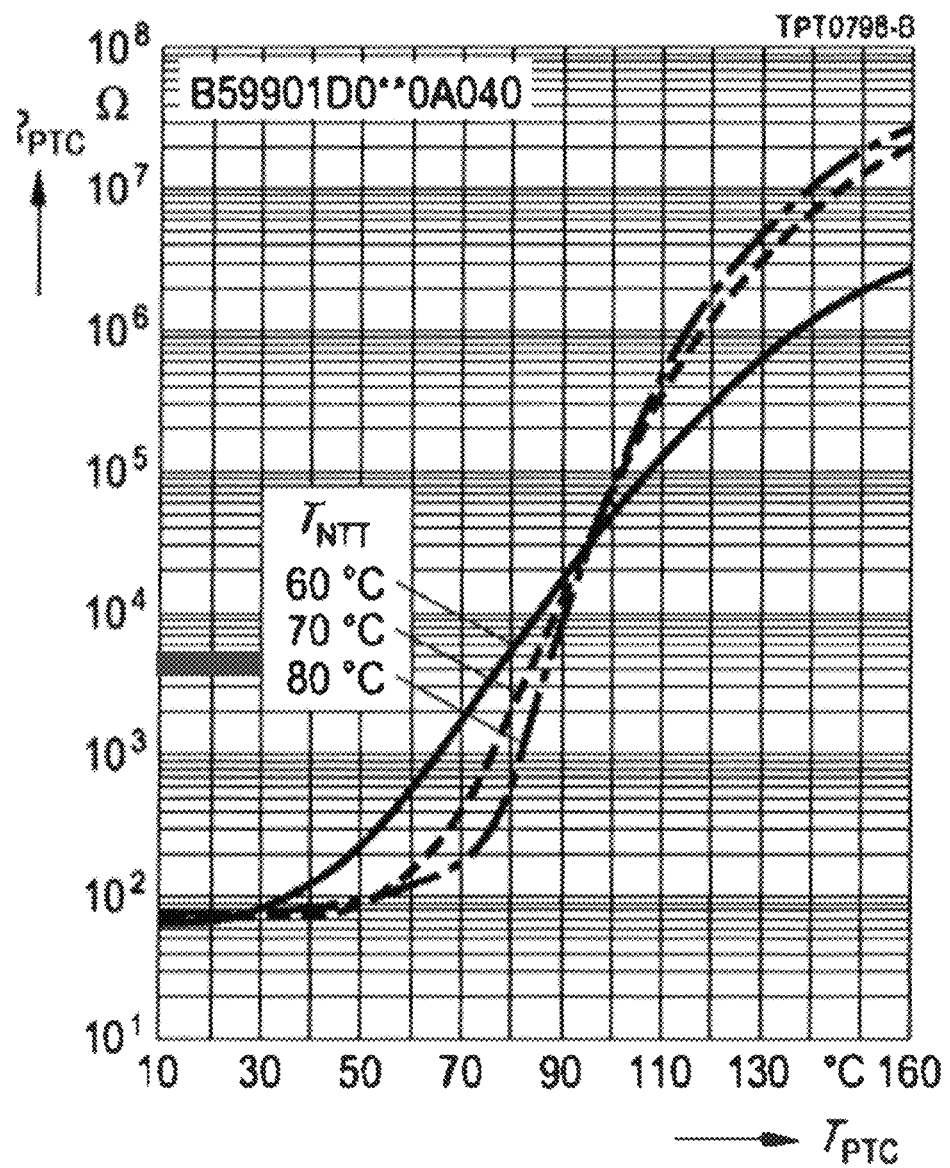
FIG. 2: an example of a resistance vs. temperature characteristics of a PTC material.

A typical temperature behavior of a PTC element is for instance represented in FIG. 2

It will be noted that Cell A and Cell B can each represent one or more switches, cells sensor circuits with NTC and/or PTC and or THM components and resistors as a network of parallel or serial connections. It will further be appreciated that the PTC elements or NTC elements or THMs can be SMD (surface mount devices), printed or crimped to the circuit.

The invention claimed is:

1. A sensor arrangement comprising
a first sensor element for converting a physical quantity into a first electrical signal, said first sensor element having a first sensitivity and said first sensor element being operatively coupled between terminals of said sensor arrangement, and
at least a second sensor element for converting said physical quantity into a second electrical signal, said second sensor element having a second sensitivity different from said first sensitivity, said second sensor element being operatively connected between said terminals of said sensor arrangement via a temperature controlled switching element so that in a first state of said temperature controlled switching element, said second electrical signal combines with said first electrical signal to form a sensor output signal, and in a second state of said temperature controlled switching element, a contribution of said second electrical signal to said sensor output signal is substantially reduced with respect to a respective contribution in said first state of said temperature controlled switching element.

2. The sensor arrangement according to claim 1, wherein said second sensitivity of said second sensor element is higher than said first sensitivity of said first sensor element.

3. The sensor arrangement according to claim 1, wherein said second sensitivity of said second sensor element is lower than said first sensitivity of said first sensor element.

4. The sensor arrangement according to claim 1, wherein said temperature controlled switching element is in said first state when an environmental temperature is below a first threshold temperature and said temperature controlled switching element is in said second state when an environmental temperature is above a second threshold temperature.

5. The sensor arrangement according to claim 1, wherein said temperature controlled switching element comprises at least one of an NTC element, PTC element or thermo switch.

6. The sensor arrangement according to claim 1, wherein said first electrical signal is a resistance of said first sensor element and said second electrical signal is a resistance of said second sensor element.

7. The sensor arrangement according to claim 6, wherein
in said first state, said temperature controlled switching element has a low electrical resistance and
in said second state, said temperature controlled switching element has a high electrical resistance.

8. The sensor arrangement according to claim 6, wherein
in said first state, said temperature controlled switching element has a high electrical resistance and
in said second state, said temperature controlled switching element has a low electrical resistance.

9. The sensor arrangement according to claim 6, wherein said second sensor element is connected in series with said temperature controlled switching element between said terminals of said sensor arrangement.

10. The sensor arrangement according to claim 6, wherein said second sensor element is connected in series with said temperature controlled switching element between said terminals of said sensor arrangement.

11. The sensor arrangement according to claim 1, wherein said first sensor element and said at least one second sensor element are pressure sensors and wherein said physical quantity is a pressure acting on said first sensor element and on said at least one second sensor element.

12. An occupant sensor for a vehicle seat comprising
a first pressure sensor for converting a pressure acting on said first pressure sensor into a first electrical signal, said first pressure sensor having a first sensitivity and said first pressure sensor being operatively coupled between terminals of said occupant sensor, and
at least a second pressure sensor for converting a pressure acting on said second pressure sensor into a second electrical signal, said second pressure sensor having a second sensitivity different from said first sensitivity, said second pressure sensor being operatively connected between said terminals of said sensor arrangement via a temperature controlled switching element so that in a first state of said temperature controlled switching element, said second electrical signal combines with said first electrical signal to form a sensor output signal, and in a second state of said temperature controlled switching element, a contribution of said second electrical signal to said sensor output signal is substantially reduced with respect to a respective contribution in said first state of said temperature controlled switching element.

13. The occupant sensor according to claim 12, wherein said first electrical signal is a resistance of said first pressure sensor and said second electrical signal is a resistance of said second pressure sensor.

14. The occupant sensor according to claim 12, wherein said temperature controlled switching element comprises at least one of an NTC element, PTC element or thermo switch, and wherein said second pressure sensor is connected in series with said temperature controlled switching element between said terminals of said occupant sensor.

15. The occupant sensor according to claim 12, wherein said first and second pressure sensors are foil type pressure sensors.

16. The occupant sensor according to claim 12, wherein said first and second pressure sensors are arranged on or in a seating surface of a vehicle seat under a seat trim, in or at a suspension of a seat cushion, in or at a seat frame or a seat structure of a vehicle seat or in seat mounting features of a vehicle.

17. An occupant sensor for a vehicle seat comprising
a first pressure sensor for converting a pressure acting on said first pressure sensor into a first electrical signal, said first pressure sensor having a first sensitivity and said first pressure sensor being operatively coupled between terminals of said occupant sensor, and
at least a second pressure sensor for converting a pressure acting on said second pressure sensor into a second electrical signal, said second pressure sensor having a second sensitivity different from said first sensitivity, said second pressure sensor being operatively connected between said terminals of said sensor arrangement via a temperature controlled switching element so that in a first state of said temperature controlled switching element, said second electrical signal combines with said first electrical signal to form a sensor output signal, and in a second state of said temperature controlled switching element, a contribution of said second electrical signal to said sensor output signal is substantially reduced with respect to a respective contribution in said first state of said temperature controlled switching element;

wherein said first electrical signal is a resistance of said first pressure sensor and said second electrical signal is a resistance of said second pressure sensor;

wherein said temperature controlled switching element comprises at least one of an NTC element, PTC element or thermo switch, and wherein said second pressure sensor is connected in series with said temperature controlled switching element between said terminals of said occupant sensor;

wherein said first and second pressure sensors are foil type pressure sensors; and wherein said first and second pressure sensors are arranged on or in a seating surface of a vehicle seat under a seat trim, in or at a suspension of a seat cushion, in or at a seat frame or a seat structure of a vehicle seat or in seat mounting features of a vehicle.

* * * * *